United States Patent
Wiseman et al.

(10) Patent No.: US 7,624,272 B2
(45) Date of Patent: Nov. 24, 2009

(54) PLATFORM INFORMATION FOR DIGITAL SIGNATURES

(75) Inventors: Willard M. Wiseman, Vernonia, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1171 days.

(21) Appl. No.: 10/404,717

(22) Filed: Mar. 31, 2003

(65) Prior Publication Data

US 2004/0193888 A1    Sep. 30, 2004

(51) Int. Cl.
*H04K 1/00* (2006.01)
(52) U.S. Cl. .................. 713/176; 713/181; 713/170; 713/180
(58) Field of Classification Search .......... 713/176, 713/170
See application file for complete search history.

(56) References Cited

U.S. PATENT DOCUMENTS

| | | | |
|---|---|---|---|
| 6,507,656 B1 * | 1/2003 | Jakobsson | 380/30 |
| 6,848,048 B1 * | 1/2005 | Holmes | 713/162 |
| 6,918,036 B1 * | 7/2005 | Drews | 713/176 |
| 2002/0144121 A1 * | 10/2002 | Ellison et al. | 713/176 |
| 2002/0194482 A1 * | 12/2002 | Griffin et al. | 713/176 |
| 2003/0012374 A1 * | 1/2003 | Wu et al. | 380/44 |
| 2003/0028774 A1 * | 2/2003 | Meka | 713/176 |
| 2004/0059917 A1 * | 3/2004 | Powers | 713/176 |

* cited by examiner

*Primary Examiner*—Nasser G Moazzami
*Assistant Examiner*—Fikremariam Yalew
(74) *Attorney, Agent, or Firm*—Fish & Richardson P.C.

(57) ABSTRACT

An integrity signature may provide information about a platform used to create a digital signature. The value of a digital signature may be related to the integrity and trustworthiness of the platform on which it is created. Signed platform integrity information provides a measure of trust regarding the platform used to create the digital signature. The integrity signature may be created separately from a document signature, or a combined integrity and document signature may be provided.

21 Claims, 6 Drawing Sheets

PLATFORM INFORMATION FOR DIGITAL SIGNATURES

BACKGROUND

A digital signature may be used to provide proof of a document's authenticity of its approval by the signator. For example, a digital signature may be used to authenticate that a digital document was created by a particular person and that it has not been altered since it was created. The digital signature may be created, then appended to the document to be authenticated.

There are a number of methods that may be used to create a digital signature. One method uses a hash algorithm with public/private key encryption/decryption. The encryption/decryption is asymmetric; that is, a private key is used to encrypt a hash value, while a different, public key is used to decrypt the hash value. The private key is held securely by a single computer or encryption device, while the public key is provided by the computer to other computers for signature verification.

A digital signature may be produced from a byte stream indicative of the original document or file to be signed (referred to herein as "Doc"), using a hash algorithm H and an encryption function E as follows:

$$Sig = E(H(Doc))$$

That is, the byte stream forming the document is hashed by the hash algorithm to produce a hash. The hash is therefore based on the document contents. The hash is encrypted to produce the digital signature.

Hash algorithms, such as the SHA-1 algorithm (Secure Hash Algorithm 1), generally produce a small (e.g., 160 bit) value using the byte stream of the original document.

The encryption function E uses a private key denoted by $PrvKey_{sig}$ to encrypt the hash value, which may then be decrypted by the corresponding public key. Encryption may be performed using a signing token such as a SmartCard. The signing token may store a private key and an encryption algorithm.

The digital signature may be verified by decrypting the digital signature using the corresponding public key and a decryption function D as follows: $D(Sig) = H(Doc)$.

DESCRIPTION OF DRAWINGS

Like reference symbols in the various drawings indicate like elements.

DETAILED DESCRIPTION

The above-described method of producing a digital signature ensures that the source of the signature had access to the private key which was used. However, if the private key is not guarded securely, unauthorized persons may gain access to the private key and subsequently generate digitally signed documents using the private key.

Even if the private key is secure, other portions of the digital signature process may be vulnerable to attack. For example, if the platform is not secure, the document may be altered before the hash algorithm operates on it. In that case, the content of the document that is signed and hence the content of the hash is different than the content of the document that was approved or created by the signor.

For additional protection, systems and techniques described herein may be used to provide platform integrity information, as well as attestation of the platform integrity information. That is, the systems and techniques may be used to provide information about the components, configuration, and/or identity/authenticity of the platform that created the digital signature, as well as to provide proof that the platform integrity information is valid. Upon receipt of the document's digital signature and platform's attestation, a party can decide the value and strength of the signature based on the information.

Systems and techniques of the current disclosure may be used with platforms conforming to the Trusted Computing Group (TCG) standards. TCG includes a protected area termed the TPM (Trusted Platform Module) and an unprotected area termed the TSS (the TCG Software Stack).

Figure 1:
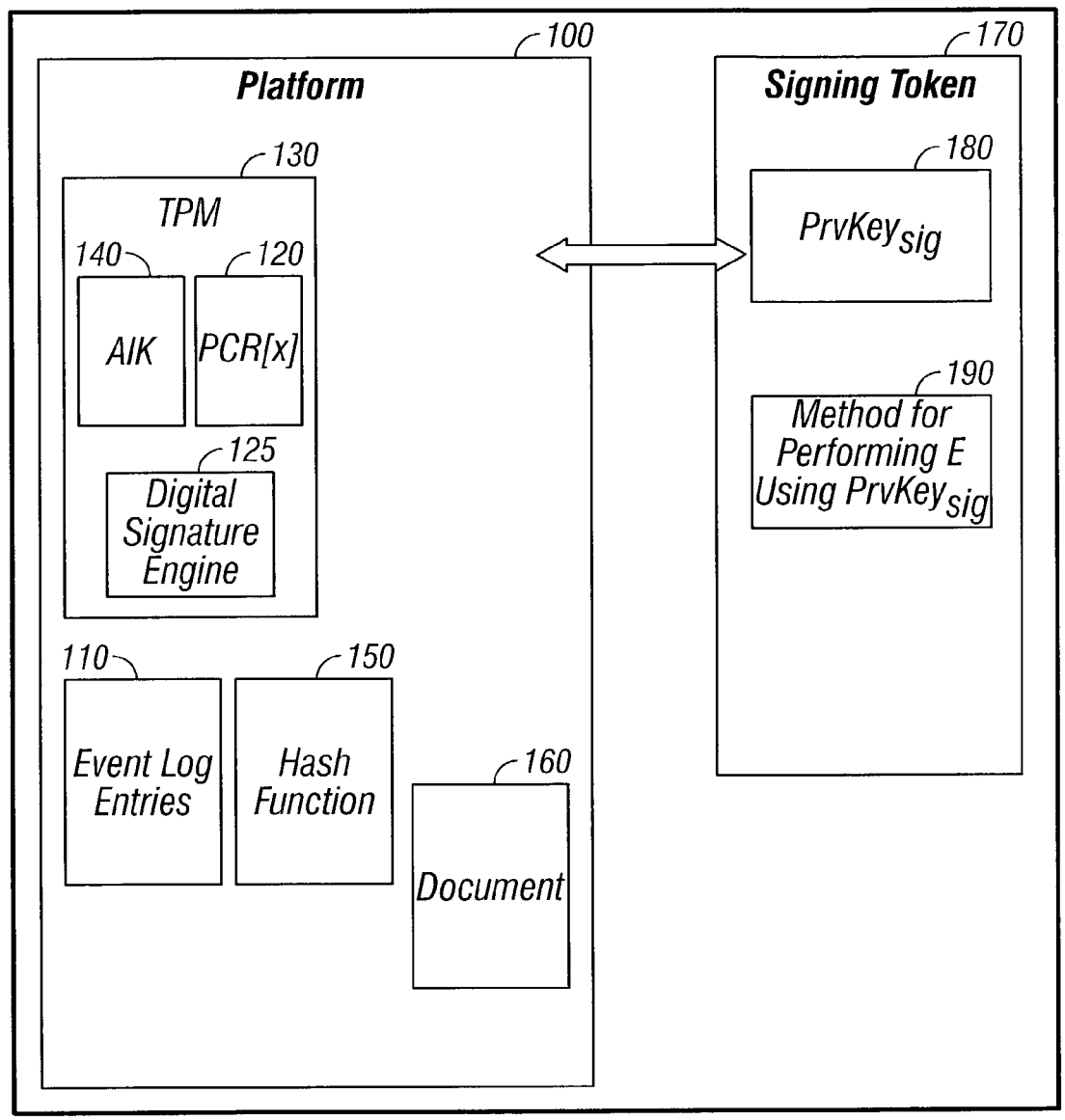
FIG. 1 is a schematic of a system to produce a document signature and an integrity signature, according to an embodiment of the invention.

FIG. 1 shows a system that may be used to provide integrity information for an integrity signature. A platform 100 implementing TCG may use three mechanisms: an event log 110 including one or more event log entries, a set of TPM-based Platform Configuration Registers (PCRs) such as one or more register PCR[x] 120, and a hardware-based digital signature engine 125. Herein, PCR[x] refers to a particular register or set of registers, while PCR[x] refers to the value of PCR[x]. Platform 100 may be a data processing system such as a computer system, Personal Data Assistant (PDA), or other system.

The PCRs are registers holding information about the platform. In some TCG systems, there are 16 PCRs, which may each hold a hash value representing one or more platform components such as the BIOS, the operating system, the keyboard driver, the video driver, etc.

Event Log 110 includes a sequence of structures describing some aspect of the platform (for example, its components and/or configuration). Event log 110 may include information that is also reflected in the value of one or more of the PCRs, but in a more accessible form (e.g., the event log entries may be human-readable). However, since the size of event log entries is generally much larger than the size of the data in the PCRs (usually a 160 bit hash value), their use may not be efficient for some digital signature applications.

The platform's identity/authenticity may be provided by one or more Attestation Identity Keys (AIKs) such as an AIK 140. The AIK keys are asymmetric keys, where the private component is associated with and loaded into one and only one TPM such as TPM 130 of FIG. 1.

The value of the PCR[x] 120 can be signed using AIK 140, using a Quote function. The function receives a set of requested PCR indices and a nonce from the caller. The nonce is a number (e.g., a number generated in a random number generator or monotonic counter) that avoids replay attacks; that is, it assures that the signed value was produced in response to the current request, rather than produced at an earlier time. TPM 130 returns a signature of the nonce and the value of the requested PCRs (such as the value of PCR[x] 120 of FIG. 1). That is, the signature covers both the nonce and the value of the PCR(s).

A cryptographic device such as a signing token 170 may be removably connected to platform 100 or may be integrated with the platform; e.g., as software and/or hardware. For example, signing token 170 may be an attached device such as a SmartCard that may be inserted into and/or removed from platform 100. Signing token 170 may include a private key 180, and an encryption algorithm 190 for performing encryption using private key 180. Note that encryption algorithm 190 may also include a hash engine for performing the hash function, so that in some implementations the hashing may be done in the signing token. Private key 180 and encryption algorithm 190 may be implemented as software and/or hardware in signing token 170.

Figure 2A:
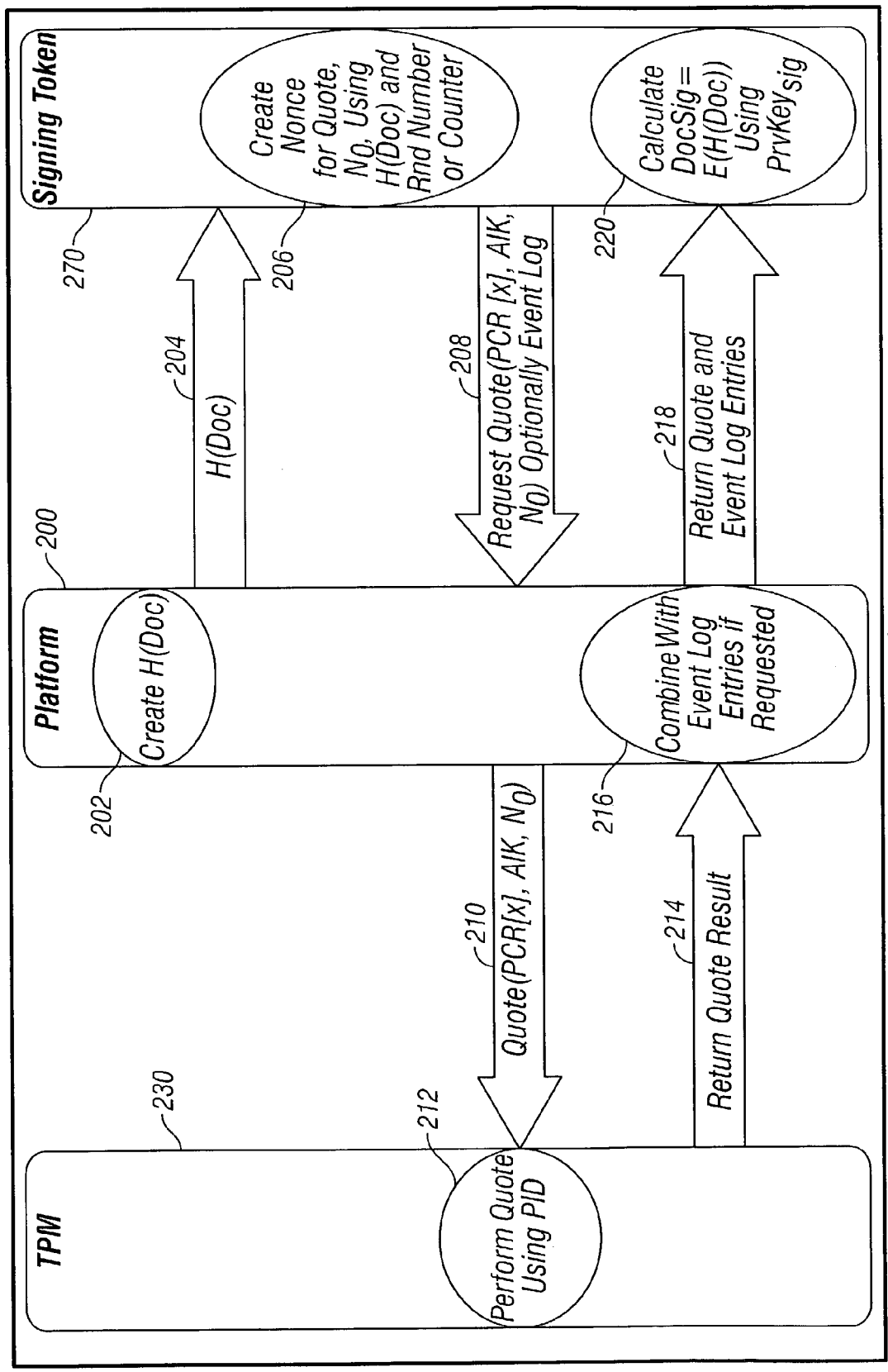
FIGS. 2A and 2B illustrate generation of a separate document signature and integrity signature, according to an embodiment of the invention.
Figure 2B:
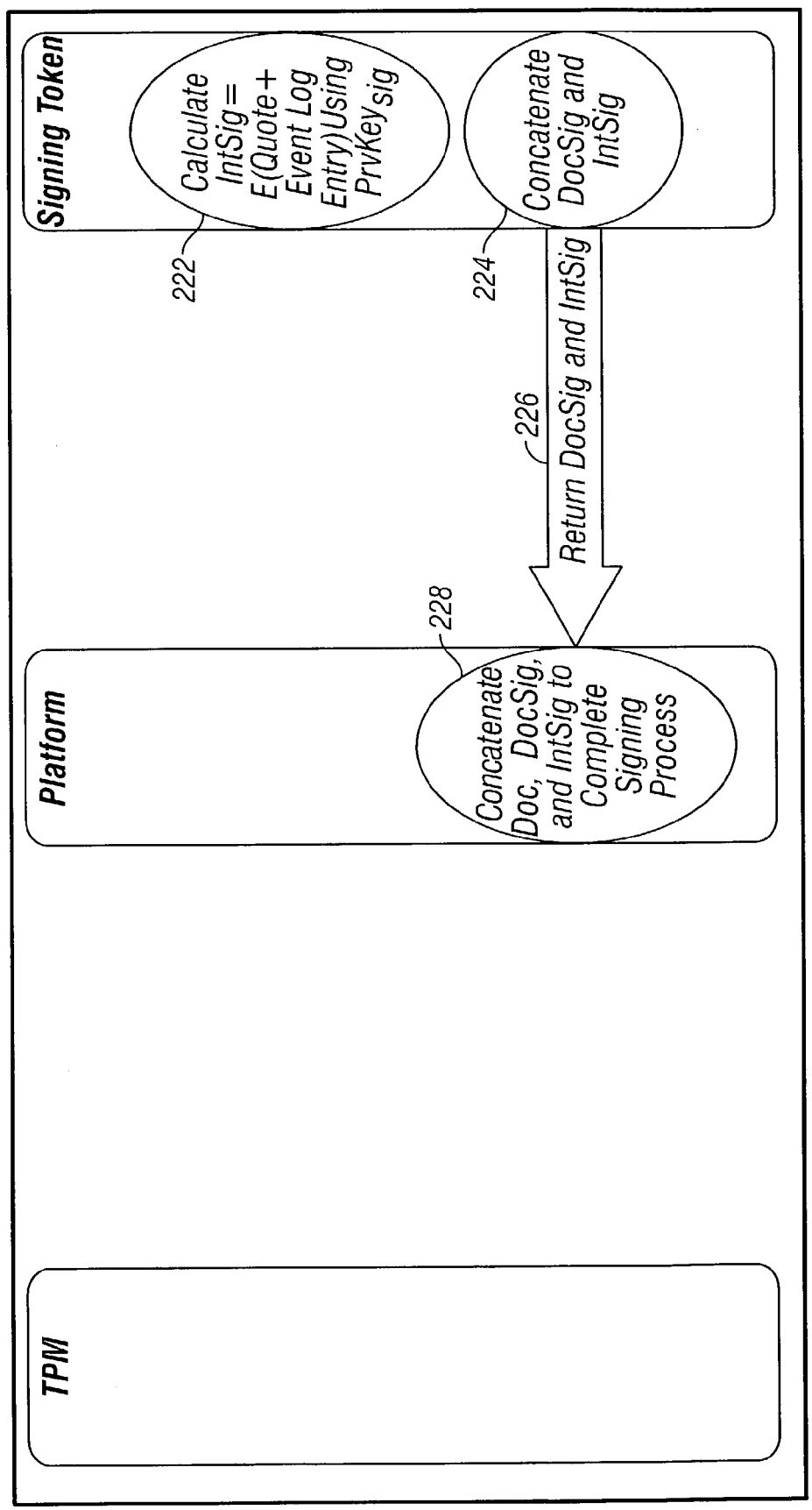

Referring to FIGS. 2A and 2B, a document signature and an integrity signature may be created using a platform 200, a signing token 270, and a TPM 230 (note again that some or all of platform 200, signing token 270, and TPM 230 may be implemented in a single device or may be implemented in multiple devices).

For a document with a byte stream denoted by Doc on platform 200, platform 200 creates H(Doc) at 202. H(Doc) is a hash of the unencrypted byte stream representing the original document or file to be signed. The output of the hash function is generally a 160 bit hash.

H(Doc) is sent to signing token 270 (204), which hashes the combination of H(Doc) with (for example) an internally generated random number or monotonic counter to produce the nonce $N_0$ used for the Quote function (206). In some implementations, a user must provide a password or other user identification before the signing token may be used.

Signing token 270 issues a call for a Quote function to platform 200 specifying at least one of a set of user or application defined PCR registers, the nonce $N_0$, an AIK tag, and optionally one or more event log entries. Alternately, platform 200 may issue the call for the Quote function.

Platform 200 loads the AIK and may prompt a user for authorization to use the AIK (e.g., for providing a second proof of the user's identity). Note that requiring a user to provide one or more passwords or other identifiers at different stages in the process provides for a more secure digital signature, but is less convenient for the user. Therefore, some implementations may require more instances of user authorization/verification, while others require less.

Platform 200 issues the Quote command to TPM 230 (e.g., per the TCG specification), using the values passed from signing token 270 (210). TPM 230 performs the Quote function using the AIK and $N_0$ (212) and returns the Quote result (214), where the Quote result is the signed value of the requested PCR[x] value(s). Platform 200 sends the Quote result, along with any requested event log entries, to signing token 270 (218). Information related to the integrity of the platform (e.g. the Quote result and event log entries) may be referred to as the integrity information.

Signing token 270 calculates a DocSig (for example, using standard digital signature methods such as by encrypting H(Doc) using $PrvKey_{sig}$) (220). Signing token 270 generates the integrity signature IntSig by signing the integrity information to create IntSig=E(H(Integrity)), where the encrypting may use $PrvKey_{sig}$ (222). Signing token 270 concatenates DocSig and IntSig (224), and returns DocSig and IntSig to the application on platform 200 (226). The application appends these to the document; e.g., using standard methods (228).

The systems and techniques shown in FIGS. 2A and 2B, and described above, may be used to produce a separate DocSig and IntSig using two encryption steps. This implementation may be used with systems that do not have the capability to deal with IntSig. That is, the implementation shown in FIGS. 2A and 2B and described above is backward compatible.

Figure 3A:
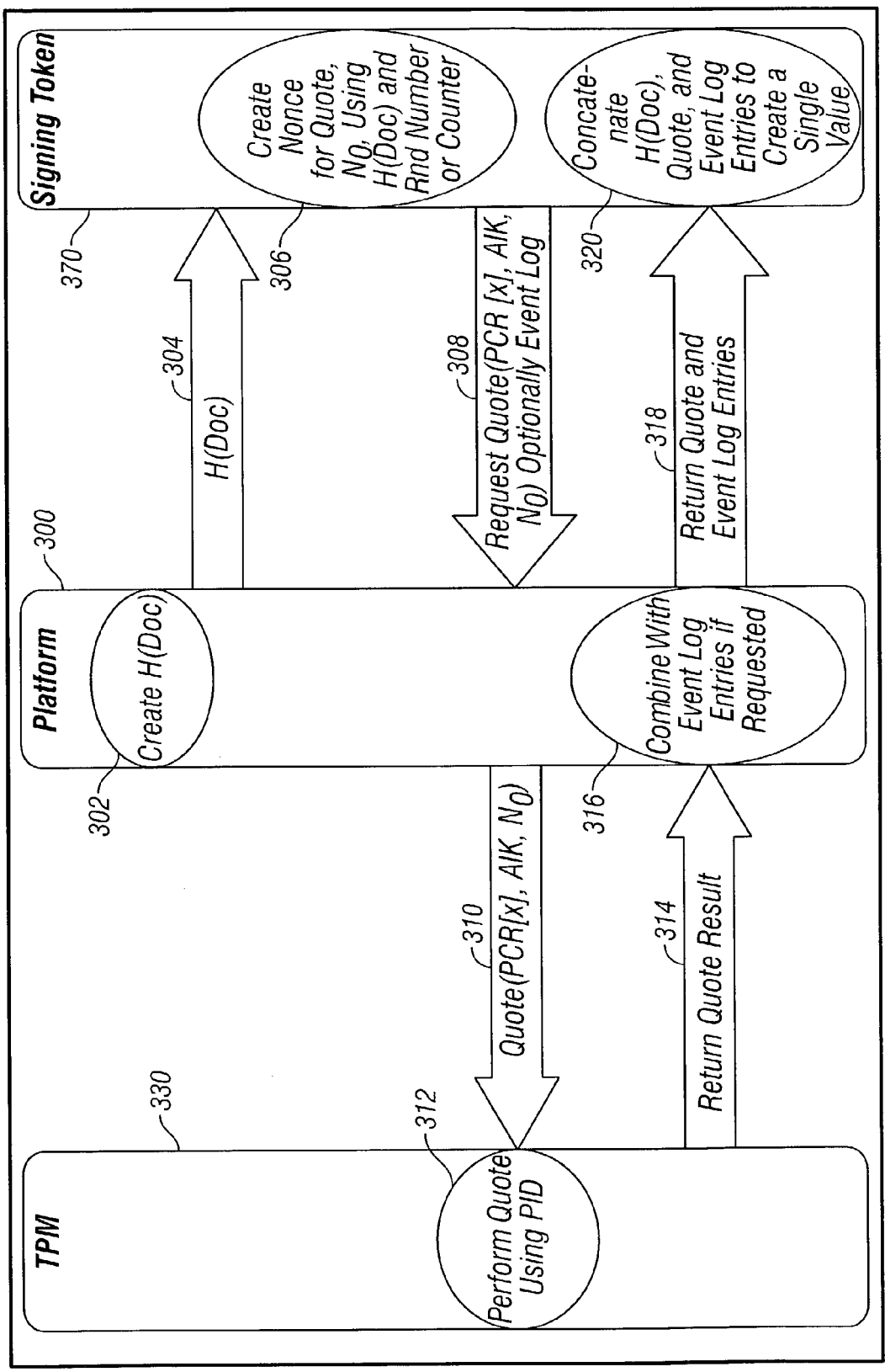
FIGS. 3A and 3B illustrate generation of a combined document and integrity signature, according to an embodiment of the invention.
Figure 3B:
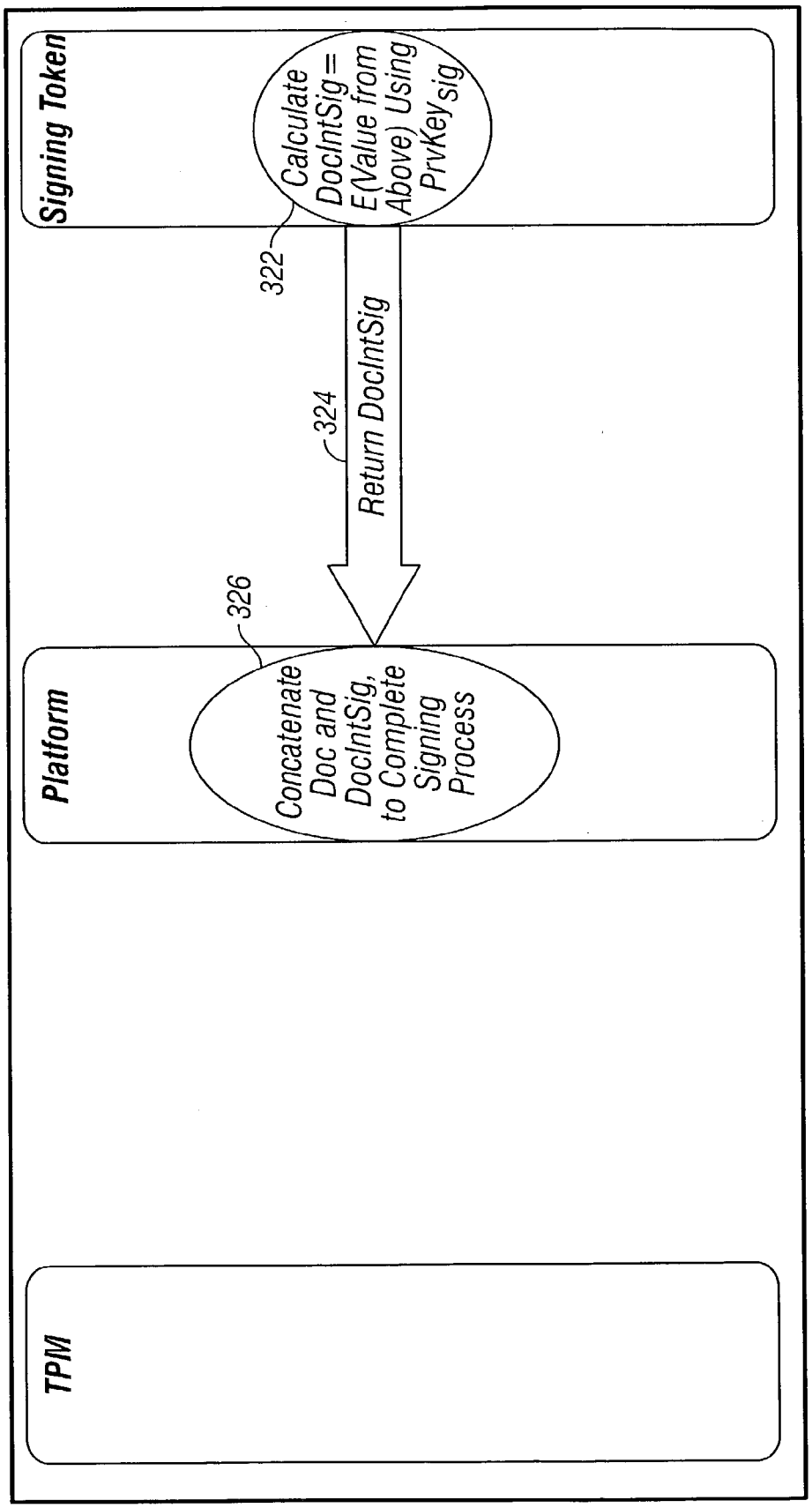

Referring to FIGS. 3A and 3B, an alternate implementation for providing platform information and attestation is shown in which a combined document and integrity signature may be created using a platform 300, a signing token 370, and a TPM 330 (note that as in the implementation of FIGS. 2A and 2B, some or all of platform 300, signing token 370, and TPM 330 may be implemented in a single device or may be implemented in multiple devices).

Similar to the implementation of FIGS. 2A and 2B, for a document on platform 300 having a byte stream denoted by Doc, platform 300 creates H(Doc) (302). H(Doc) is sent to signing token 370 (304), which stores H(Doc). Signing token 370 hashes the combination of H(Doc) with (for example) an internally generated random number or monotonic counter to produce the nonce $N_0$ used for the Quote function (306).

Signing token 370 (or platform 300) issues a Quote function to platform 300 specifying a set of user or application defined PCR registers, the nonce $N_o$, and an AIK tag. Optionally, signing token 370 may also request a set of Event Log entries (308) from platform 300.

Platform 300 loads the AIK and may prompt a user for authorization to use the AIK. Platform 300 issues the Quote command to TPM 330 using the values passed from signing token 370 (310). TPM 330 performs the Quote function using the AIK and $N_0$ (312) and returns the Quote result (314), where the Quote result is the signed value of the requested PCR[x] value(s). Platform 300 sends the Quote result, along with any requested event log entries, to signing token 370 (318).

Signing token 370 calculates a combined DocSig and IntSig by concatenating H(doc), the result of the Quote function, and any Event Log entries (320). The concatenated information is then encrypted (322) to create a combined DocSig and IntSig (which may be referred to as DocIntSig). DocIntSig may be returned to platform 300 (324) to be concatenated with the document (326).

The implementation of FIGS. 3A and 3B may be more efficient, since the document information and integrity information is encrypted in a single encryption operation. However, a system receiving the combined DocIntSig needs the capability to interpret the combined signature, and so this implementation may not be compatible with some systems.

Figure 4:
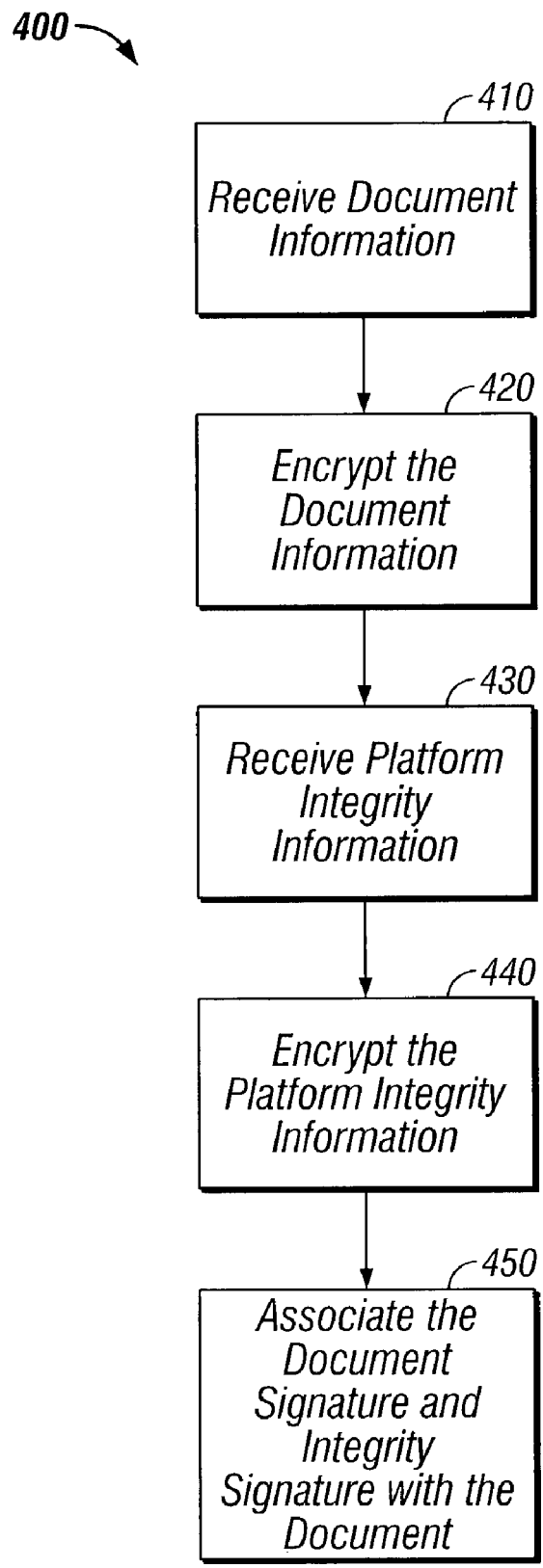
FIG. 4 shows a process for creating a document signature and a platform integrity signature, according to an embodiment of the invention.

FIG. 4 shows a process that may be used to create a document signature and an integrity signature. Document information, such as a hash of a document bit stream, is received at 410. The document information is encrypted to create a document signature at 420. Platform integrity information, such as the content of one or more of the platform configuration registers, the output of the quote function, and/or one or more event log entries is received at 430. The platform integrity information is encrypted at 440. The document signature and integrity signature are associated with the document at 450.

As explained above, encryption of the document information and the platform integrity information may be performed using two encryption steps to produce separate document and integrity signatures, or they may be performed using a single encryption step to produce a combined document and integrity signature.

A number of implementations have been described. Nevertheless, it will be understood that various modifications may be made without departing from the spirit and scope of the invention. For example, other systems and techniques for encryption and producing digital signatures may be used. The acts shown in FIGS. 2-4 may in some cases be performed in orders different from those shown. In different implementations, some functionality of the signing token may be provided by the platform, and vice versa. In some implementations, an article includes a machine-readable medium storing instructions operable to cause one or more machines to perform operations that include: receiving document information based on a byte stream of a document; encrypting the document information to create a document signature; receiving platform integrity information based on one or more characteristics of a platform; and encrypting the platform integrity information to create an integrity signature. Accordingly, other implementations are within the scope of the following claims.

What is claimed is:

1. A method, comprising:
   receiving document information based on a byte stream of a document;
   encrypting the document information to create a document signature;
   receiving platform integrity information based on one or more characteristics of a platform; and
   encrypting the platform integrity information to create an integrity signature; and
   concatenating the document information and the platform integrity information prior to encrypting the document information and the platform integrity information;
   wherein encrypting the document information and encrypting the platform integrity information are done in the same encrypting process to create a combined document and integrity signature.

2. The method of claim 1, wherein the document information includes a hash of the byte stream of the document.

3. The method of claim 1, further including associating the combined document and integrity signature with the document.

4. The method of claim 1, wherein the one or more characteristics of the platform include the value of one or more platform configuration registers of the platform.

5. The method of claim 1, wherein the one or more characteristics of the platform include one or more event log entries.

6. The method of claim 1, wherein the platform integrity information is based on an output of a quote function performed in a Trusted Platform Module.

7. The method of claim 6, wherein the quote function uses an attestation identity key.

8. A platform comprising:
   one or more registers to store platform information;
   a digital signature engine to sign the platform information;
   a cryptographic device to encrypt document information to produce a document signature and to encrypt integrity information based on the platform information to produce an integrity signature;
   wherein the cryptographic device is configured to concatenate the document information and the platform integrity information prior to encrypting the document information and the integrity information, and to create the document signature and the integrity signature as a combined signature using a single encryption process.

9. The platform of claim 8, wherein the digital signature engine comprises hardware in a trusted platform module of the platform.

10. The platform of claim 8, wherein the cryptographic device is removably coupled with the platform.

11. The platform of claim 8, wherein the cryptographic device is implemented in at least one of hardware and software.

12. The platform of claim 8, further comprising one or more event log entries stored on the platform.

13. An article comprising a machine-readable medium storing instructions operable to cause one or more machines to perform operations comprising:
    receiving document information based on a byte stream of a document;
    encrypting the document information to create a document signature;
    receiving platform integrity information based on one or more characteristics of a platform;
    encrypting the platform integrity information to create an integrity signature; and
    concatenating the document information and the platform integrity information prior to encrypting the document information and the platform integrity information,
    wherein encrypting the document information and encrypting the platform integrity information are done in the same encrypting process to create a combined document and integrity signature.

14. The article of claim 13, wherein the document information includes a hash of the byte stream of the document.

15. The article of claim 13, wherein the operations further comprise associating the combined document and integrity signature with the document.

16. The article of claim 13, wherein the one or more characteristics of the platform include the value of one or more platform configuration registers of the platform.

17. The article of claim 13, wherein the one or more characteristics of the platform include one or more event log entries.

18. The article of claim 13, wherein the platform integrity information is based on an output of a quote function performed in a Trusted Platform Module.

19. A system, comprising:
    means for storing an electronic file to be signed;
    means for encrypting data based on the electronics file to produce a document signature;
    means for storing platform integrity information; and
    means for encrypting the platform integrity information to produce an integrity signature;
    wherein the means for encrypting the data based on the electronic file to produce an document signature and the means for encrypting the platform integrity information to produce and integrity signature are performed in a single encryption process to produce a combined document and integrity signature; and
    the means for encrypting the data based on the electronic file and the means for encrypting the platform integrity information concatenate the document information and the platform integrity information prior to the single encryption process.

20. The system of claim 19, further comprising means for signing the platform integrity information.

21. The system of claim 20, wherein the means for encrypting the platform integrity information is to encrypt the signed platform integrity information.

* * * * *